(12) United States Patent
Yang

(10) Patent No.: US 9,830,012 B2
(45) Date of Patent: Nov. 28, 2017

(54) TOUCH MODULE AND MANUFACTURE METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Shengji Yang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 633 days.

(21) Appl. No.: 14/345,755

(22) PCT Filed: Jun. 18, 2013

(86) PCT No.: PCT/CN2013/077416
§ 371 (c)(1),
(2) Date: Mar. 19, 2014

(87) PCT Pub. No.: WO2014/139232
PCT Pub. Date: Sep. 18, 2014

(65) Prior Publication Data
US 2016/0179266 A1    Jun. 23, 2016

(30) Foreign Application Priority Data

Mar. 13, 2013 (CN) .......................... 2013 1 0080023

(51) Int. Cl.
*G06F 3/041* (2006.01)
*G06F 3/044* (2006.01)
(Continued)

(52) U.S. Cl.
CPC ............ *G06F 3/0416* (2013.01); *G06F 3/044* (2013.01); *G06F 3/046* (2013.01); *G06F 3/047* (2013.01);
(Continued)

(58) Field of Classification Search
CPC . G06F 2203/04103; G06F 2203/04106; G06F 3/0416; G06F 3/044; G06F 3/046; G06F 3/047
(Continued)

(56) References Cited

U.S. PATENT DOCUMENTS

2002/0053474 A1* 5/2002 Chao ..................... G06F 3/046
178/18.03
2004/0105040 A1* 6/2004 Oh ..................... G02F 1/13338
349/12
(Continued)

FOREIGN PATENT DOCUMENTS

CN    202523040 A    11/2012
CN    202523040 U    11/2012
(Continued)

OTHER PUBLICATIONS

Yang et al., Translation of KR20040084503, Oct. 6, 2004.*
(Continued)

*Primary Examiner* — Dmitriy Bolotin
(74) *Attorney, Agent, or Firm* — Ladas & Parry LLP

(57) ABSTRACT

A touch module and a manufacture method thereof are provided. The touch module includes a substrate, and a first transparent electrode layer a metal layer, an insulating layer, a second transparent electrode layer and a protective layer that are formed on the substrate. Both of the first transparent electrode layer and the second transparent electrode layer include at least two electromagnetic touch electrodes and at least two capacitive touch electrodes. The electromagnetic
(Continued)

touch electrodes and the capacitive touch electrodes in the first transparent electrode layer are arranged in parallel and alternately. The electromagnetic touch electrodes and the capacitive touch electrodes in the second transparent electrode layer are arranged in parallel and alternately.

20 Claims, 5 Drawing Sheets

(51) Int. Cl.
  *G06F 3/046* (2006.01)
  *G06F 3/047* (2006.01)
(52) U.S. Cl.
  CPC .............. *G06F 2203/04103* (2013.01); *G06F 2203/04106* (2013.01)
(58) Field of Classification Search
  USPC ............... 345/174; 427/58; 178/18.06, 18.07
  See application file for complete search history.

(56) References Cited

U.S. PATENT DOCUMENTS

| 2008/0042985 | A1 | 2/2008 | Katsuhito et al. | |
|---|---|---|---|---|
| 2010/0328249 | A1* | 12/2010 | Ningrat | G06F 3/046 345/174 |
| 2011/0298748 | A1* | 12/2011 | Chen | G06F 3/044 345/174 |
| 2011/0315536 | A1* | 12/2011 | Chiou | G06F 3/043 200/600 |
| 2012/0162108 | A1 | 6/2012 | Chan et al. | |
| 2012/0169400 | A1 | 7/2012 | Liu | |
| 2013/0181937 | A1* | 7/2013 | Chen | G06F 3/044 345/174 |
| 2014/0062916 | A1* | 3/2014 | Hong | G06F 3/041 345/173 |
| 2014/0063385 | A1 | 3/2014 | Yang | |

FOREIGN PATENT DOCUMENTS

| CN | 102830555 A | 12/2012 |
|---|---|---|
| CN | 102955639 A | 3/2013 |
| CN | 203217549 U | 9/2013 |
| JP | 3164187 B2 | 5/2001 |
| JP | 2007-287118 A | 11/2007 |
| JP | 2012-133763 A | 7/2012 |
| KR | 20040042485 A | 5/2004 |
| KR | 20040084503 A | 10/2004 |
| KR | 20090108534 A | 10/2009 |

OTHER PUBLICATIONS

Yang et al. Translation of CN102955639, Mar. 6, 2013.*
Zhengqian et al., Translation of CN202523040, Jul. 11, 2012.*
Korean Office Action dated Jan. 25, 2016; Appln. No. 10-2014-7008786.
First Chinese Office Action dated Jun. 1, 2016; Appln. No. 201310080023.3.
International Search Report Appln. No. PCT/CN2013/077416; dated Dec. 19, 2013.
Korean Office Action dated Jul. 1, 2015; Appln. No. 10-2014-7008786.
International Preliminary Report on Patentability Appln. No. PCT/CN2013/077416; dated Sep. 15, 2015.
Extended European Search Report dated Aug. 5, 2016; Appln. No. 13834284.5-1507 /2975505 PCT/CN2013077416.
Second Chinese Office Action dated Jan. 6, 2017; Appln. No. 201310080023.3.
Japanese Office Action dated Mar. 13, 2017; Appln. No. 2015-561902.

* cited by examiner

TOUCH MODULE AND MANUFACTURE METHOD THEREOF

TECHNICAL FIELD

Embodiments of the invention relate to a touch module capable of achieving both electromagnetic touch function and capacitive touch function, and a manufacture method of the touch module.

BACKGROUND

Since its emergence in 1964, electromagnetic touch technology has been widely used for intelligent digital device. At present, an electromagnetic antenna plate in an electromagnetic touch module generally adopts a back-attached structure and is composed of a transverse metal wire and a longitudinal metal wire that are intersect with each other. The electromagnetic antenna plate is thick and nontransparent, so it can only be adhered to a rear side of an LCD Module (LCM). Since an electromagnetic touch pen and the electromagnetic antenna plate with the above back-attached structure is spaced by the LCM, it is necessary to enhance the electromagnetic signal intensity of the electromagnetic touch pen during the touch operation in order to realize a smooth touch, which will result in an increase in power consumption.

SUMMARY OF THE INVENTION

According to an embodiment of the invention, there is provided a touch module. The touch module comprises a substrate, and a first transparent electrode layer, a metal layer, an insulating layer, a second transparent electrode layer and a protective layer that are formed on the substrate. Both of the first transparent electrode layer and the second transparent electrode layer include at least two electromagnetic touch electrodes and at least two capacitive touch electrodes. The electromagnetic touch electrodes and the capacitive touch electrodes in the first transparent electrode layer are arranged in parallel and alternately. The electromagnetic touch electrodes and the capacitive touch electrodes in the second transparent electrode layer are arranged in parallel and alternately.

According to another embodiment of the invention, there is provided a manufacture method of a touch module. The method comprises forming a first transparent electrode layer, a metal layer, an insulating layer, a second transparent electrode layer and a protective layer on a substrate. Both of the first transparent electrode layer and the second transparent electrode layer include at least two electromagnetic touch electrodes and at least two capacitive touch electrodes. During forming the first transparent electrode layer, the electromagnetic touch electrodes and the capacitive touch electrodes in the first transparent electrode layer are formed to be arranged in parallel and alternately. During forming the second transparent electrode layer, the electromagnetic touch electrodes and the capacitive touch electrodes in the second transparent electrode layer are formed to be arranged in parallel and alternately.

According to the embodiments of the invention, the electromagnetic touch electrodes and the capacitive touch electrodes are arranged in parallel and alternately in the same layer; the electromagnetic touch electrodes and the capacitive touch electrodes can operate without interference with each other, so that the touch module with the electromagnetic touch function and the capacitive touch function can be realized without additional mask process. Accordingly, the thickness of the resultant product can be decreased. In addition, the processes for forming the electromagnetic touch electrodes and the capacitive touch electrodes can be performed on the back surface of a color filter (CF) substrate. Therefore, the manufacture cost can be decreased, the added value of the resultant product can be improved, and this technology can satisfy the requirements of production transformation of LCD panel factory.

According to the embodiments of the invention, the electromagnetic touch function suitable for handwriting input is perfectly combined with the capacitive touch function suitable for finger input, the electromagnetic touch electrodes and the capacitive touch electrodes can be separately driven so that the electromagnetic touch electrodes and the capacitive touch electrodes can operate simultaneously or individually without interference with each other. Thus, the product competition can be improved.

According to the embodiments of the invention, the conventional technology in which the electromagnetic antenna plate can only be adhered to the rear side of the LCM is changed, and the electromagnetic touch antenna is positioned in front of the LCM and is transparent, so that the smooth touch can be realized without increasing the electromagnetic signal intensity of the electromagnetic touch pen. In this way, the power consumption can be greatly reduced.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
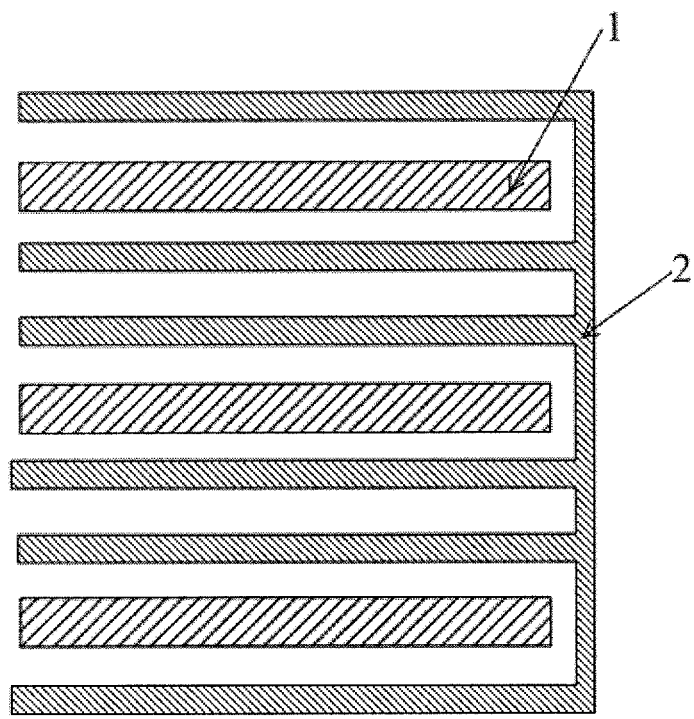
FIG. 1 is a schematic view illustrating an arrangement manner of an electromagnetic touch electrode and an capacitive touch electrode in a touch module according to an embodiment of the invention.
Figure 2:
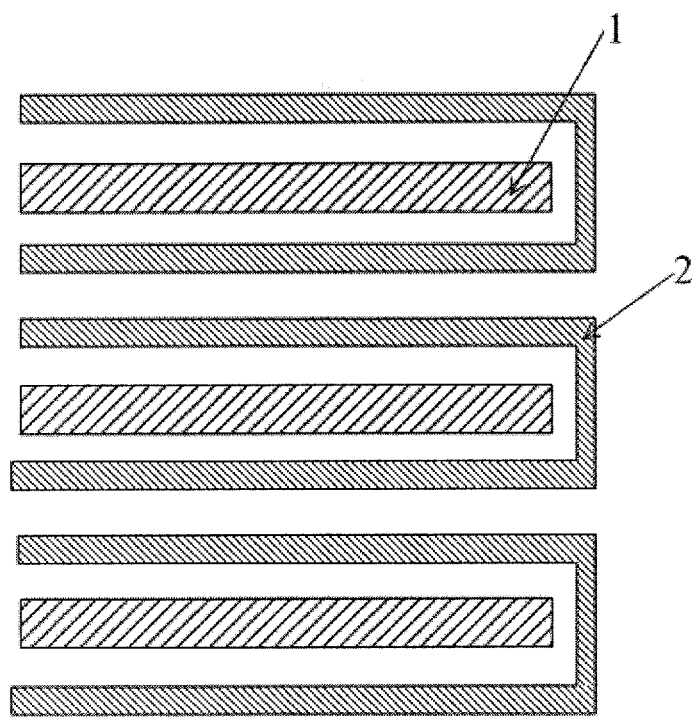
FIG. 2 is a schematic view illustrating another arrangement manner of the electromagnetic touch electrode and the capacitive touch electrode in the touch module according to the embodiment of the invention.
Figure 5:
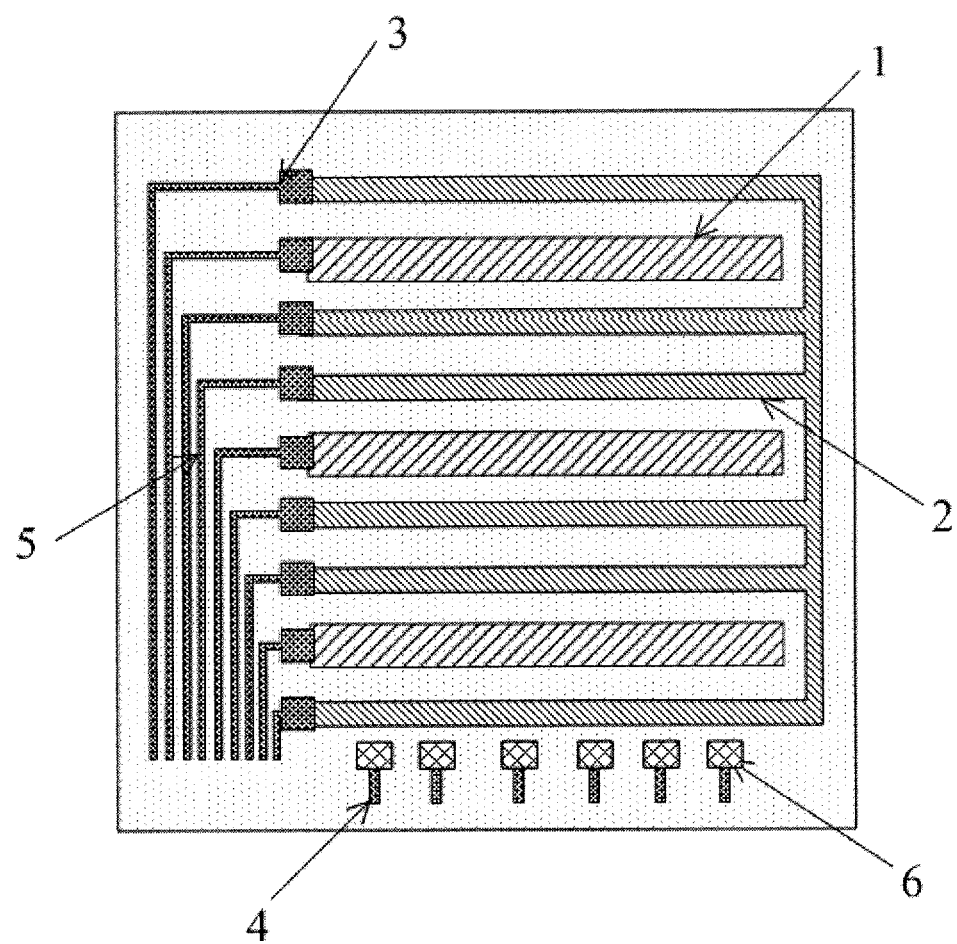
Figure 6:
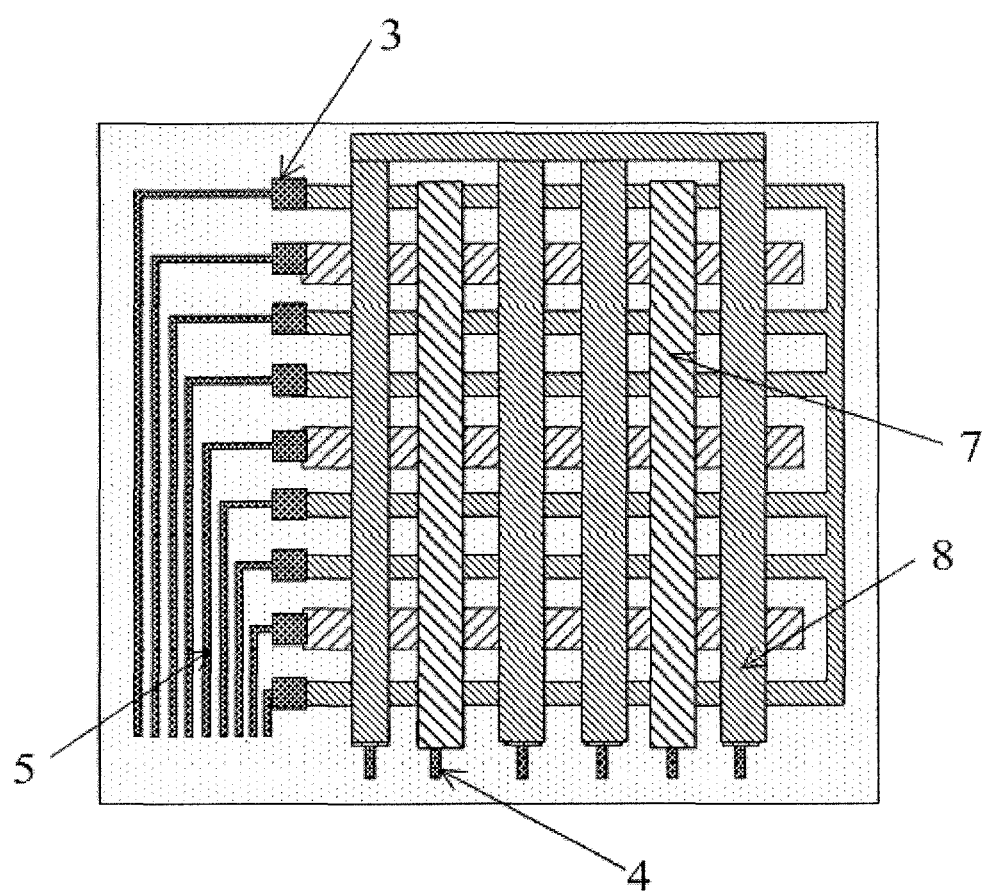
Figure 7:
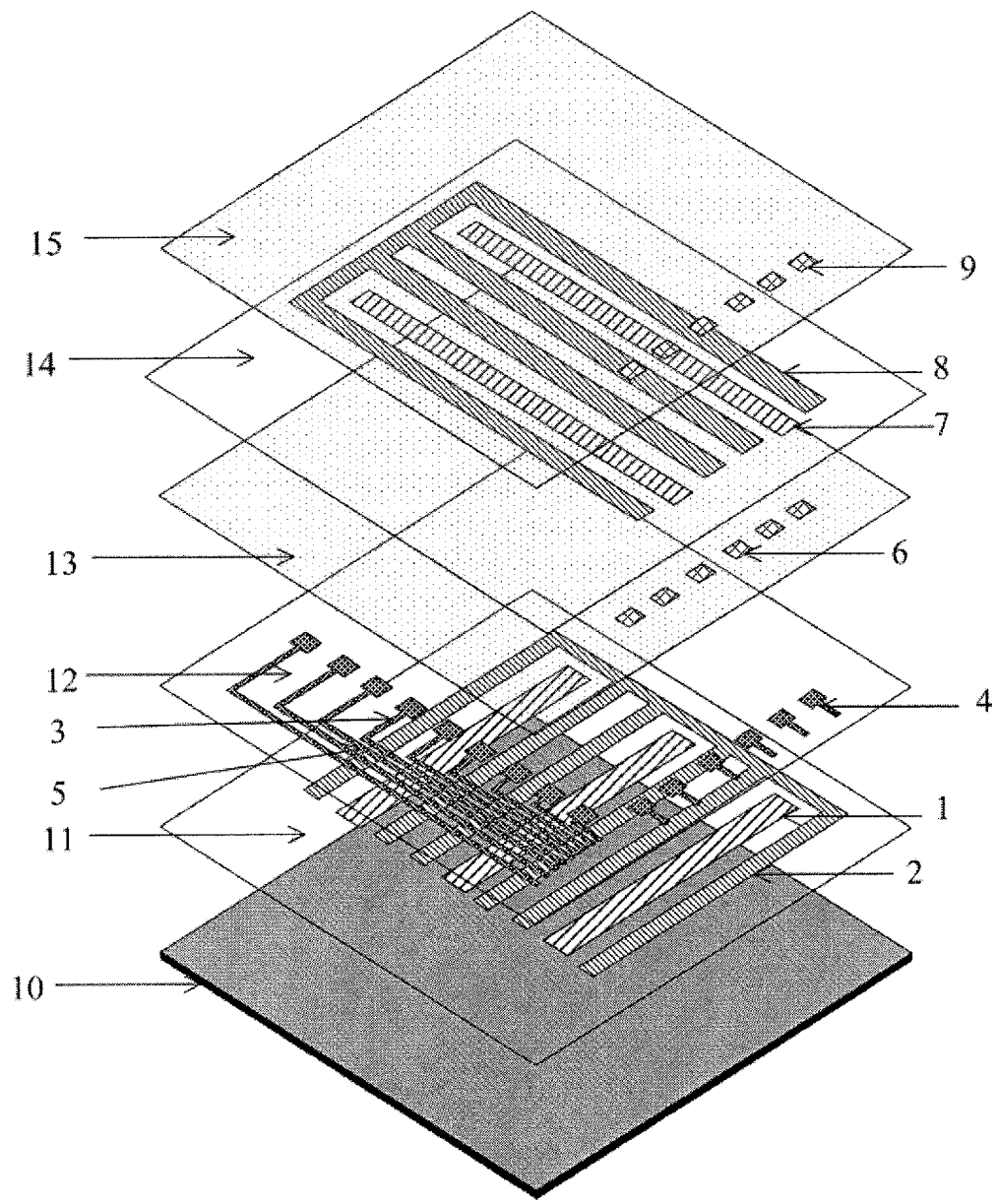
FIG. 7 is a structural schematic view illustrating the touch module according to the embodiment of the invention.

FIG. 1 is a schematic view illustrating an arrangement manner of an electromagnetic touch electrode and an capacitive touch electrode in a touch module according to an embodiment of the invention, FIG. 2 is a schematic view illustrating another arrangement manner of the electromagnetic touch electrode and the capacitive touch electrode in the touch module according to the embodiment of the invention, FIGS. 3-6 are schematic views illustrating a manufacture method of the touch module according to the embodiment of the invention, and FIG. 7 is a structural schematic view illustrating the touch module according to the embodiment of the invention. Hereinafter, the touch module according to the embodiment of the invention will be explained in detail in conjunction with the accompanying drawings.

According to the embodiment of the invention, the touch module comprises a glass substrate 10, and a first transparent electrode layer 11, a metal layer 12, an insulating layer 13, a second transparent electrode layer 14 and a protective layer 15 that are formed on the glass substrate 10.

Figure 3:
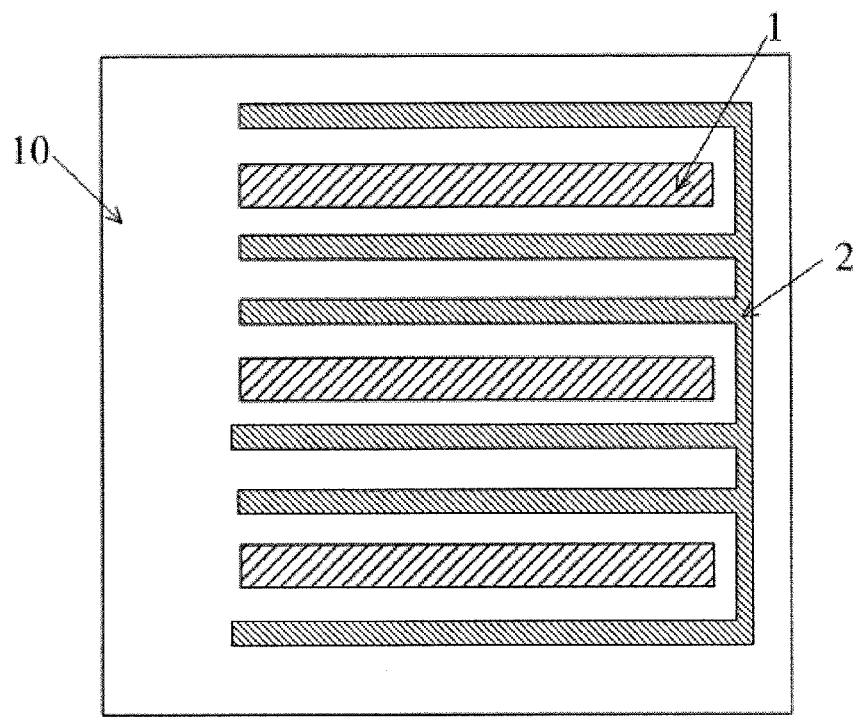
FIGS. 3-6 are schematic views illustrating a manufacture method of the touch module according to the embodiment of the invention.

As shown in FIG. 3, the first transparent electrode layer 11 is formed on the glass substrate 10; the first transparent electrode layer 11 includes at least two first electromagnetic touch electrodes 2 and at least two capacitive touch drive electrodes 1 which are arranged in parallel and alternately; and each of the first electromagnetic touch electrodes 2 and each of the capacitive touch drive electrodes 1 extend along a first direction.

Figure 4:
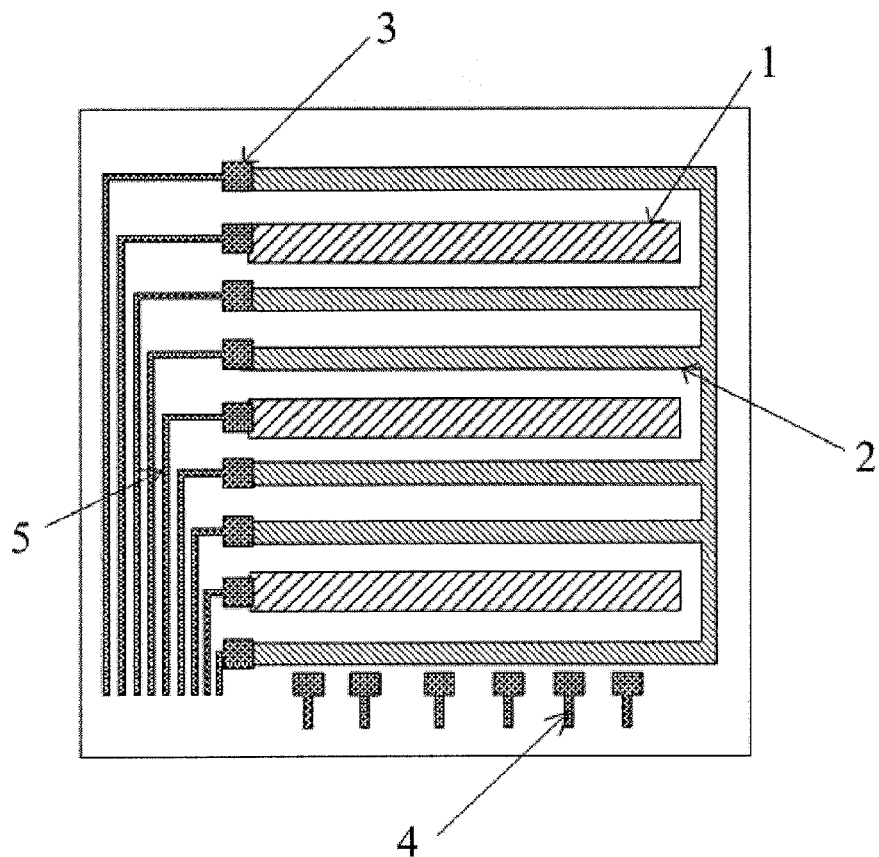

As shown in FIG. 4, the metal layer 12 is formed on the first transparent electrode layer 11; the metal layer 12 includes first metal wires 5, first contact pins 3, second metal wires (not shown in FIG. 4) and second contact pins 4. One end of the first electromagnetic touch electrodes 2 and one end of the capacitive touch drive electrodes 1 are connected with the first contact pins 3 in one-to-one manner, and then the first contact pins 3 are connected with the first metal wires 5 in one-to-one manner. The second contact pins 4 are connected with the second metal wires (not shown) in one-to-one manner. Here, the second contact pins 4 will be further connected with electrodes in the second transparent electrode layer 14 in one-to-one manner As shown in FIG. 5, the insulating layer 13 is formed on the metal layer 12 and the first transparent electrode layer 11; and via holes 6 are formed in the insulating layer 13 at positions corresponding to the second contact pins 4.

As shown in FIG. 6, the second transparent electrode layer 14 is formed on the insulating layer 13; the second transparent electrode layer 14 includes at least two second electromagnetic touch electrodes 8 and at least two capacitive touch sense electrodes 7 which are arranged in parallel and alternately; and each of the second electromagnetic touch electrodes 8 and each of the capacitive touch sense electrodes 7 extend along a second direction. The second direction intersects with the first direction. For example, the second direction is perpendicular to the first direction. One end of the second electromagnetic touch electrodes and one end of the capacitive touch sense electrodes are connected with the second contact pins 4 through the via holes 6 in the insulating layer in one-to-one manner.

The protective layer 15 is formed on the second transparent electrode layer 14; and via holes 9 are formed in the protective layer 15 at positions corresponding to the via holes 6 in the insulating layer 13.

Here, both the capacitive touch drive electrode 1 and the capacitive touch sense electrode 7 can be referred as capacitive touch electrodes.

One end of the first electromagnetic touch electrodes is connected with each other in the first transparent electrode layer; and one end of the second electromagnetic touch electrodes is connected with each other in the second transparent electrode layer.

It should be noted that, the number of the first contact pins 3 is equal to that of the electrodes in the first transparent electrode layer; and the number of the second contact pins 4, the number of the via holes in the insulating layer and the number of the electrodes in the second transparent electrode layer are equal to each other.

In FIGS. 3-7, the electromagnetic touch electrode is provided on both sides of each capacitive touch electrode. However, the embodiment of the invention is not limited thereto. In practice, the number of the electromagnetic touch electrodes and the number of capacitive touch electrodes can be reduced or increased according to the size of the touch panel. In addition, the distance between the electromagnetic touch electrodes, the distance between the capacitive touch electrodes and the distance between the capacitive touch electrode and the electromagnetic touch electrode and the like can be adjusted according to the resolution of the touch panel. The electromagnetic touch electrodes may be arranged according to the manner shown in FIG. 1, namely, one end of the electromagnetic touch electrodes is connected with each other. In addition, the electromagnetic touch electrodes may be arranged according to the manner shown in FIG. 2, namely, one end of two adjacent electromagnetic touch electrodes is connected with each other.

In the touch module according to the embodiment of the invention, the electromagnetic touch electrodes and the capacitive touch electrodes are arranged in parallel and alternately in the same layer; the electromagnetic touch electrodes and the capacitive touch electrodes can be separately driven so that the electromagnetic touch electrodes and the capacitive touch electrodes can operate simultaneously or individually without interference with each other. Thus, the touch module having both electromagnetic touch function and capacitive touch function can be realized without additional mask process, and thus the thickness of the resultant product can be reduced, the manufacture cost can be decreased and the product competition can be improved.

The embodiment of the invention further provides a manufacture method of the touch module. The method comprises the following steps.

Step 1: forming the first transparent electrode layer 11 on the glass substrate 10;

The first transparent electrode layer 11 includes the first electromagnetic touch electrodes 2 and the capacitive touch drive electrodes 1 which are arranged in parallel and alternately, as shown in FIG. 3. Each of the first electromagnetic touch electrodes 2 and each of the capacitive touch drive electrodes 1 extend along the first direction.

Step 2: forming the metal layer 12 on the first transparent electrode layer 11;

The metal layer 12 includes the first metal wires 5, the first contact pins 3, the second metal wires (not shown) and the second contact pins 4, as shown in FIG. 4.

Here, the step of forming the metal layer 12 is as follows:

The first metal wires 5 and the first contact pins 3 are formed in the metal layer 12; one end of the first electromagnetic touch electrodes 2 and one end of the capacitive touch drive electrodes 1 are connected with the first contact pins in one-to-one manner; and the first contact pins 3 are connected with the first metal wires 5 in one-to-one manner. At the same time, the second contact pins 4 and the second metal wires are formed in the metal layer 12; and the second contact pins are connected with the second metal wires (not shown in FIG. 4) in one-to-one manner. The second contact pins 4 will be further connected with the electrodes in the second transparent electrode layer 14.

Step 3: forming the insulating layer 13 on the metal layer 12 and the first transparent electrode layer 11;

The insulating layer 13 is used for insulating the first transparent electrode layer 11 from the second transparent electrode layer 14; and the via holes 6 are formed in the insulating layer 13 at the positions corresponding to the second contact pins 4, as shown in FIG. 5.

Step 4: forming the second transparent electrode layer 14 on the insulating layer 13. The second transparent electrode layer 14 includes the second electromagnetic touch electrodes 8 and the capacitive touch sense electrodes 7 which are arranged in parallel and alternately.

One end of the second electromagnetic touch electrodes 8 and one end of the capacitive touch sense electrodes 7 are connected with the second contact pins 4 through the via holes 6 in the insulating layer in one-to-one manner, as shown in FIG. 6.

Step 5: forming the protective layer 15 on the second transparent electrode layer 14. The via holes 9 are formed in the protective layer 15 at the positions corresponding to the via holes 6 in the insulating layer.

In the manufacture method of the touch module according to the embodiment of the invention, the touch module having both electromagnetic touch function and capacitive touch function can be realized without additional mask process; and the processes for forming the electromagnetic touch electrodes and the capacitive touch electrodes can be performed on the back surface of a color filter (CF) substrate. Therefore, the manufacture cost can be decreased, the added value of the resultant product can be improved, and this technology can satisfy the requirements of production transformation of LCD panel factory.

The foregoing embodiments merely are exemplary embodiments of the invention, and not intended to define the scope of the invention, and the scope of the invention is determined by the appended claims.

What is claimed is:

1. A touch module, comprising: a substrate, and a first transparent electrode layer, a metal layer, an insulating layer, a second transparent electrode layer and a protective layer that are formed on the substrate, wherein
both of the first transparent electrode layer and the second transparent electrode layer include at least two electromagnetic touch electrodes and at least two capacitive touch electrodes;
the electromagnetic touch electrodes and the capacitive touch electrodes in the first transparent electrode layer are arranged in parallel and alternately;
the electromagnetic touch electrodes and the capacitive touch electrodes in the second transparent electrode layer are arranged in parallel and alternately;
the electromagnetic touch electrodes and the capacitive touch electrodes in the first transparent electrode layer are connected with first contact pins in the metal layer in one-to-one manner; and
a number of the electromagnetic touch electrodes in the first transparent electrode layer is more than two, and ends of the electromagnetic touch electrodes in the first transparent electrode layer, which are away from the first contact pins, are connected with each other.

2. The touch module according to claim 1, wherein each of the electromagnetic touch electrodes and each of the capacitive touch electrodes in the first transparent electrode layer extend along a first direction;
each of the electromagnetic touch electrodes and each of the capacitive touch electrodes in the second transparent electrode layer extend along a second direction; and the first direction and the second direction intersect with each other.

3. The touch module according to claim 2, wherein one end of the electromagnetic touch electrodes in the second transparent electrode layer is connected with each other.

4. The touch module according to claim 2, wherein one end of two adjacent electromagnetic touch electrodes in the second transparent electrode layer is connected with each other.

5. The touch module according to claim 2, wherein the electromagnetic touch electrodes and the capacitive touch electrodes in the second transparent electrode layer are connected with second contact pins in the metal layer in one-to-one manner through via holes in the insulating layer.

6. The touch module according to claim 1, wherein one end of the electromagnetic touch electrodes in the second transparent electrode layer is connected with each other.

7. The touch module according to claim 1, wherein one end of two adjacent electromagnetic touch electrodes in the second transparent electrode layer is connected with each other.

8. The touch module according to claim 1, wherein the electromagnetic touch electrodes and the capacitive touch electrodes in the second transparent electrode layer are connected with second contact pins in the metal layer in one-to-one manner through via holes in the insulating layer.

9. The touch module according to claim 1, wherein
the electromagnetic touch electrodes and the capacitive touch electrodes in the second transparent electrode layer are connected with second contact pins in the metal layer in one-to-one manner through via holes in the insulating layer, and
a number of the electromagnetic touch electrodes in the second transparent electrode layer is more than two, and ends of the electromagnetic touch electrodes in the second transparent electrode layer, which are away from the second contact pins, are connected with each other.

10. The touch module according to claim 1, wherein
in the first transparent electrode layer, two or more electromagnetic touch electrodes are provided between two adjacent capacitive touch electrodes.

11. The touch module according to claim 1, wherein
in the second transparent electrode layer, two or more electromagnetic touch electrodes are provided between two adjacent capacitive touch electrodes.

12. The touch module according to claim 1, wherein
the metal layer directly contacts the first transparent electrode layer without an insulator provided therebetween.

13. A manufacture method of a touch module, comprising: forming a first transparent electrode layer, a metal layer, an insulating layer, a second transparent electrode layer and a protective layer on a substrate, wherein
both of the first transparent electrode layer and the second transparent electrode layer include at least two electromagnetic touch electrodes and at least two capacitive touch electrodes;
during forming the first transparent electrode layer, the electromagnetic touch electrodes and the capacitive touch electrodes in the first transparent electrode layer are formed to be arranged in parallel and alternately;
during forming the second transparent electrode layer, the electromagnetic touch electrodes and the capacitive touch electrodes in the second transparent electrode layer are formed to be arranged in parallel and alternately;

the electromagnetic touch electrodes and the capacitive touch electrodes in the first transparent electrode layer are connected with first contact pins in the metal layer in one-to-one manner; and a number of the electromagnetic touch electrodes in the first transparent electrode layer is more than two, and ends of the electromagnetic touch electrodes in the first transparent electrode layer, which are away from the first contact pins, are connected with each other.

14. The method according to claim 13, wherein each of the electromagnetic touch electrodes and each of the capacitive touch electrodes in the first transparent electrode layer extend along a first direction;

each of the electromagnetic touch electrodes and each of the capacitive touch electrodes in the second transparent electrode layer extend along a second direction; and the first direction and the second direction intersect with each other.

15. The method according to claim 13, wherein one end of the electromagnetic touch electrodes in the second transparent electrode layer is connected with each other.

16. The method according to claim 13, wherein one end of two adjacent electromagnetic touch electrodes in the second transparent electrode layer is connected with each other.

17. The method according to claim 13, wherein the electromagnetic touch electrodes and the capacitive touch electrodes in the second transparent electrode layer are connected with second contact pins in the metal layer in one-to-one manner through via holes in the insulating layer.

18. The method according to claim 13, wherein the electromagnetic touch electrodes and the capacitive touch electrodes in the second transparent electrode layer are connected with second contact pins in the metal layer in one-to-one manner through via holes in the insulating layer, and a number of the electromagnetic touch electrodes in the second transparent electrode layer is more than two, and ends of the electromagnetic touch electrodes in the second transparent electrode layer, which are away from the second contact pins, are connected with each other.

19. The method according to claim 13, wherein in the first transparent electrode layer, two or more electromagnetic touch electrodes are provided between two adjacent capacitive touch electrodes.

20. The method according to claim 13, wherein in the second transparent electrode layer, two or more electromagnetic touch electrodes are provided between two adjacent capacitive touch electrodes.

* * * * *